(12) United States Patent
Reynolds et al.

(10) Patent No.: US 8,917,044 B2
(45) Date of Patent: *Dec. 23, 2014

(54) ELECTRONIC CIRCUIT AND METHOD FOR DETECTING A ZERO CURRENT IN A WINDING OF AN ELECTRIC MOTOR

(75) Inventors: Timothy Reynolds, Westborough, MA (US); Chengyi Jin, Wayland, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/599,234

(22) Filed: Aug. 30, 2012

(65) Prior Publication Data

US 2014/0062365 A1 Mar. 6, 2014

(51) Int. Cl.
*H02P 6/00* (2006.01)

(52) U.S. Cl.
USPC ...... 318/400.35; 318/799; 318/809; 318/599; 318/400.12; 318/811

(58) Field of Classification Search
USPC .............. 318/400.35, 400.06, 608, 599, 811, 318/400.12, 400.11, 400.03, 400.14, 721, 318/286, 282
See application file for complete search history.

(56) References Cited

U.S. PATENT DOCUMENTS

| | | | | |
|---|---|---|---|---|
| 5,627,447 | A * | 5/1997 | Unsworth et al. | 318/801 |
| 5,811,949 | A * | 9/1998 | Garces | 318/448 |
| 6,198,256 | B1 * | 3/2001 | Miyazaki et al. | 322/16 |
| 7,590,334 | B2 | 9/2009 | Yabusaki et al. | |
| 7,747,146 | B2 | 6/2010 | Milano et al. | |
| 2006/0055352 | A1 * | 3/2006 | Mori et al. | 318/432 |
| 2007/0018599 | A1 * | 1/2007 | Yamamoto et al. | 318/439 |
| 2010/0027705 | A1 * | 2/2010 | Neubauer et al. | 375/271 |

OTHER PUBLICATIONS

Reynolds et al.; "Electronic Circuit and Method Generating Electric Motor Drive Signals Having Phase Advances in Accordance with a User Selected Relationship Between Rotational Speed of an Electric Motor and the Phase Advances;" U.S. Appl. No. 13/271,723; 33 sheets.

* cited by examiner

*Primary Examiner* — Kawing Chan
*Assistant Examiner* — Jorge L Carrasquillo
(74) *Attorney, Agent, or Firm* — Daly, Crowley, Mofford & Durkee, LLP

(57) ABSTRACT

A motor control circuit and associated techniques detect a zero crossing of a current in a motor winding by detecting a reverse current in a half bridge circuit used to drive the motor winding.

16 Claims, 9 Drawing Sheets

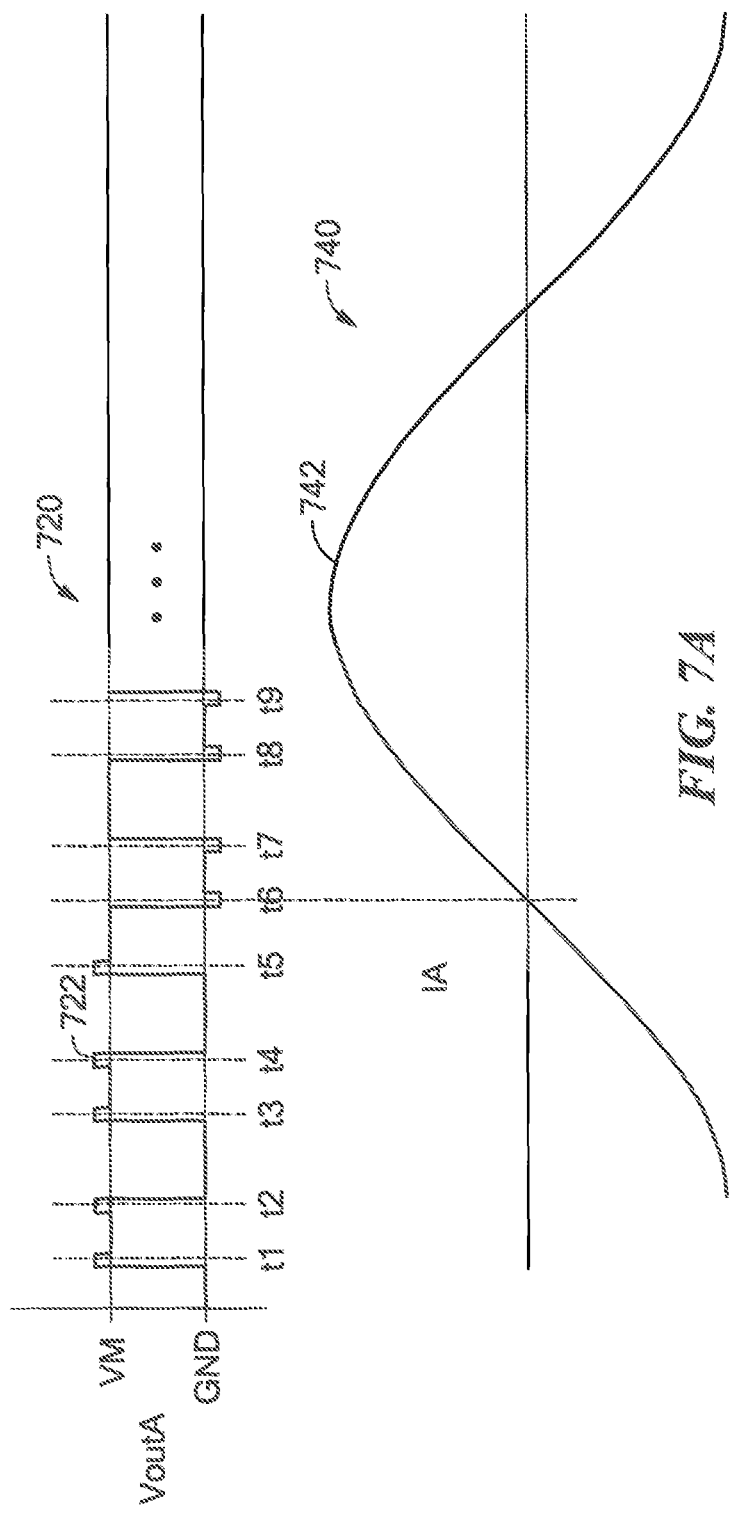

US 8,917,044 B2

ELECTRONIC CIRCUIT AND METHOD FOR DETECTING A ZERO CURRENT IN A WINDING OF AN ELECTRIC MOTOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to electric motor control circuits and, more particularly, to an electric motor control circuit that can detect a zero current in a winding of an electric motor.

BACKGROUND OF THE INVENTION

Circuits to control and drive brushless DC (BLDC) electric motors are known. In some arrangements, the circuits provide a phase advance of drive signals that drive the electric motor, the phase advance related to rotational speed of the electric motor or related to a measured motor total current. However, such circuits are only able to provide one relationship, or a small number of relationships, between phase advances and rotational speeds, in addition, external components and pins of a motor control integrated circuit (IC) may be required to set the parameter for each electric motor or each electric motor application.

Some known electric motor drive circuits are described in U.S. Pat. No. 7,590,334, issued Sep. 15, 2009, U.S. Pat. No. 7,747,146, issued Jun. 29, 2010, and U.S. patent application Ser. No. 13/271,723, filed Oct. 12, 2011, all of which are incorporated herein by reference in their entireties and assigned to the assignee of the present invention.

A BLDC electric motor can exhibit different efficiency behaviors versus speed when used in different applications. For example, the same BLDC electric motor can be used with different fan blade arrangements in different applications. Different types of BLDC electric motors can also exhibit different efficiency behaviors versus speed.

Motor noise, vibration, and efficiency are influenced by a variety of characteristics. One such characteristic is a phase of currents that appear in the motor windings relative to a rotational position of the motor. Particularly as a motor speed increases or decreases, the phase of the currents can lag or lead, respectively, a reference rotational position of the motor. Also, at high motor speeds, the current in the motor windings can tend to lag the reference position of the motor.

In view of the above, it would be desirable to provide an electric motor control circuit and associated method that can detect a phase of a current in a motor winding, for example, by detecting a zero crossing of the current.

SUMMARY OF THE INVENTION

The present invention provides an electric motor control circuit and associated method that can detect a phase of a current in a motor winding, for example, by detecting a zero crossing of the current.

In accordance with one aspect of the present invention, a method of driving a multi-phase motor having a plurality of motor windings includes generating a motor drive signal with a half bridge circuit coupled to the electric motor. The half bridge circuit includes first and second series coupled transistors; a power supply high voltage node for receiving a high power supply voltage; a power supply low voltage node for receiving a low power supply voltage; and an output node at which the motor drive signal is generated. The method also includes detecting a reverse current passing through at least one of the first or the second transistors. The detecting includes at least one of detecting a voltage at the output node that is above the high power supply voltage; or detecting a voltage at the output node that is below the low power supply voltage, the method also includes generating a zero current signal indicative of a zero crossing of a current though at least one of the plurality of motor windings in accordance with the detecting the reverse current.

In accordance with another aspect of the present invention, an electronic circuit for driving a multi-phase motor having a plurality of motor windings includes a half bridge circuit coupled to the electric motor for generating a motor drive signal. The half bridge circuit includes first and second series coupled transistors; a power supply high voltage node for receiving a high power supply voltage; a power supply low voltage node for receiving a low power supply voltage; and an output node at which the motor drive signal is generated. The electronic circuit rise includes at least one comparator configured to generate a respective at least one comparator output signal indicative of a reverse current passing through at least one of the first or the second transistors by detecting at least one of a voltage at the output node that is above the high power supply voltage; or a voltage at the output node that is below the low power supply voltage. The electronic circuit also includes a processor configured to generate a zero current signal indicative of a zero crossing of a current though at least one of the plurality of motor windings in accordance with the at least one comparator output signal.

BRIEF DESCRIPTION OF THE DRAWINGS

The foregoing features of the invention, as well as the invention itself may be more fully understood from the following detailed description of the drawings, in which:

FIG. 7A is a graph showing a PWM drive signal applied to an electric motor, and showing a sinusoidal current associated with the PWM drive signal;

DETAILED DESCRIPTION OF THE INVENTION

Before describing the present invention, some introductory concepts and terminology are explained. As used herein, the term "modulation waveform" is used to describe an envelope or characteristic function of another signal, for example, a pulse width modulated (PWM) signal.

Figure 1:
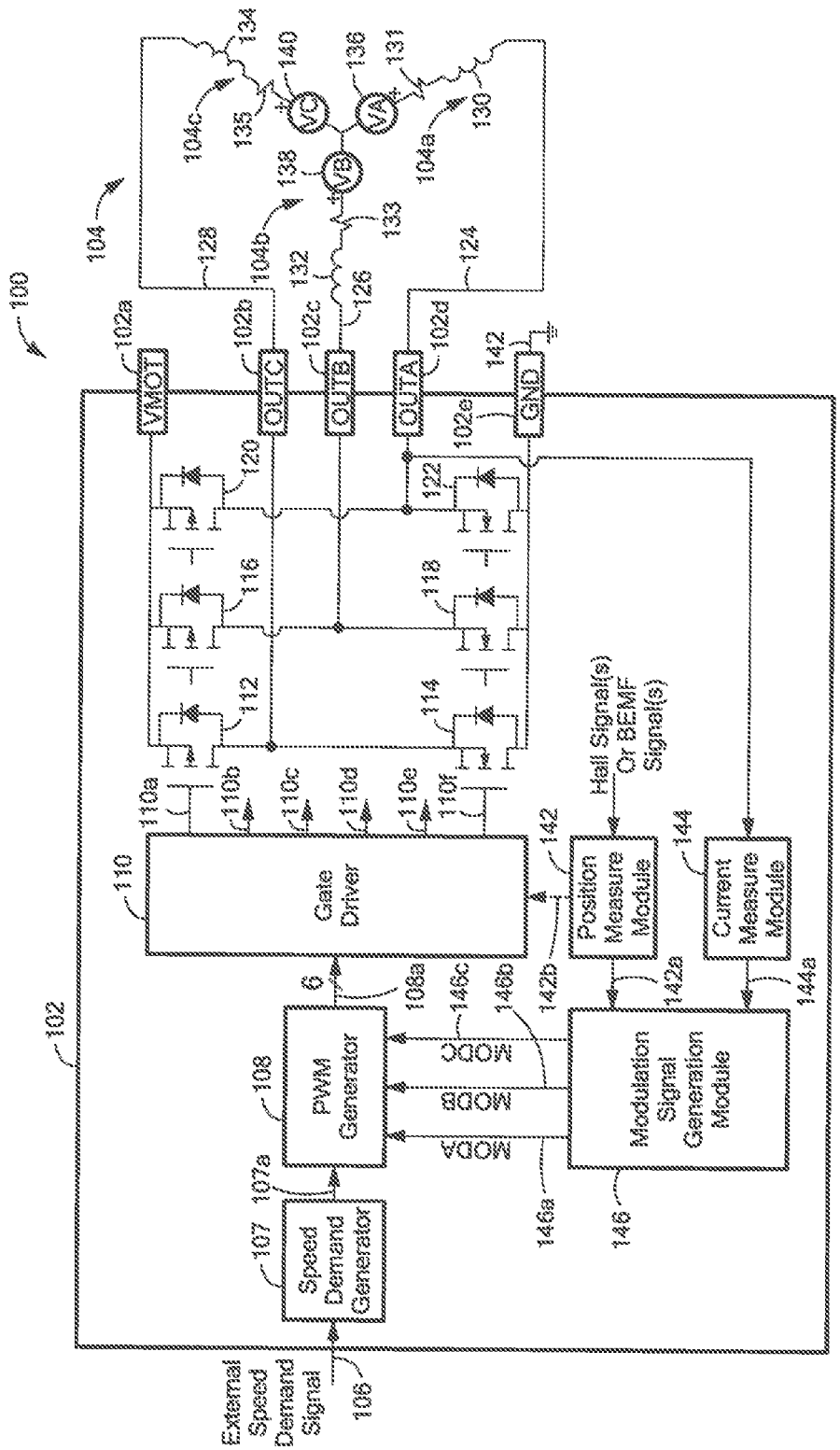
FIG. 1 is a block diagram of an exemplary motor control circuit having a modulation signal generation module and having a current measurement module.

Referring to FIG. 1, an exemplary motor control circuit 102 is coupled to drive an electric motor 104.

The motor 104 is shown to include three windings 104a, 104b, 104c, which are each often depicted as a respective equivalent circuit having an inductor in series with a resistor and in series with a back EMF voltage source. For example, the winding A 104a is shown to include an inductor 130 in series with a resistor 131 and in series with, a back EMF voltage source VA 136. The voltage of the back EMF voltage source VA 136 is not directly observable when a current is flowing in an associated motor winding, but it directly observable when the current through the associated winding is zero.

In general, the voltage across a motor winding, for example, across the winding A 140a, is governed by the following equation:

$$VoutA - Vcommon = VA + IR + LdI/dt,$$

where:

VoutA=observable voltage at one end of the winding A;
Vcommon=voltage at junction of the windings 104a, 104b, 104c;
R=resistance of the resistor 131;
L=inductance of inductor 130;
I=current through winding; and
VA=back EMF voltage Thus, it can be seen that, if the current through the winding 104a is zero, then VoutA=VA, which is an observable voltage.

The motor control circuit 102 includes a speed demand generator 107 coupled to receive an external speed demand signal 106 from outside of the motor control circuit 102. The external speed demand signal 106 can be in one of a variety of formats. In general the external speed demand signal 106 is indicative of a speed of the motor 104 that is requested from outside of the motor control circuit 102.

The speed demand generator 107 is configured to generate a speed demand signal 107a. A pulse width modulation (PWM) generator 108 is coupled to receive the speed demand signal 107a and configured to generate PWM signals 108a, a maximum duty cycle of which is controlled by the speed demand signal 107a. The PWM generator 108 is also coupled to receive modulation waveforms 146a, 146b, 146c from a modulation signal generation module 146. The PWM signals 108a are generated with a modulation characteristic (i.e., a relative time-varying duty cycle) in accordance with the modulation waveforms 146a, 146b, 146c. Modulation waveforms and associated PWM signals are described more fully below in conjunction with FIG. 6.

The motor control circuit 102 also includes a gate driver circuit 110 coupled to receive the PWM signals 108a and configured to generate PWM gate drive signals 110a, 110b, 110c, 110d, 110e, 110f to drive six transistors 112, 114, 116, 118, 120, 122 arranged as three half bridge circuits 112/114, 116/118, 120/122. The six transistors 112, 114, 116, 118, 120, 122 operate in saturation to provide three motor drive signals VoutA, VoutB, VoutC, 124, 126, 128, respectively, at nodes 102d, 102c, 102b, respectively.

The motor control circuit 102 can also include a position measurement module 142, which can be coupled to receive either back EMF signal(s) (e.g., can be coupled to receive one or more of the motor drive signals 124, 126, 128, which include back EMF signals directly observable at times when the motor windings 104a, 104b, 104c are not being driven and respective winding currents are zero) or Hall element signals from Hall elements (not shown). The position measure module 142 is configured to generate a position reference signal 142a indicative of a rotational reference position of the motor 104.

The motor control circuit 102 can also include a current measurement module 144, which can be coupled to receive one of the motor drive signals 124, 126, 128. The current measurement module 144 is configured to generate a zero current signal 144a indicative of a zero crossing of the current through one or more of the motor windings. An exemplary current measurement module is described in further detail below in conjunction with FIG. 8.

The modulation signal generation module 146 is coupled to receive the position reference signal 142a and the zero current signal 144a. The modulation signal generation module 146 is configured to change a phase of the modulation waveforms 146a, 146b, 146c in accordance with a phase difference between the position reference signal 142a and the zero current signal 144a. An exemplary modulation signal generation module 146 is described below in conjunction with FIG. 4.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

As described above, the motor control circuit 102 can automatically adjust a timing, i.e., a phase, of the drive signals 124, 126, 128 in relation to a sensed rotational position of the motor 104.

Figure 2:
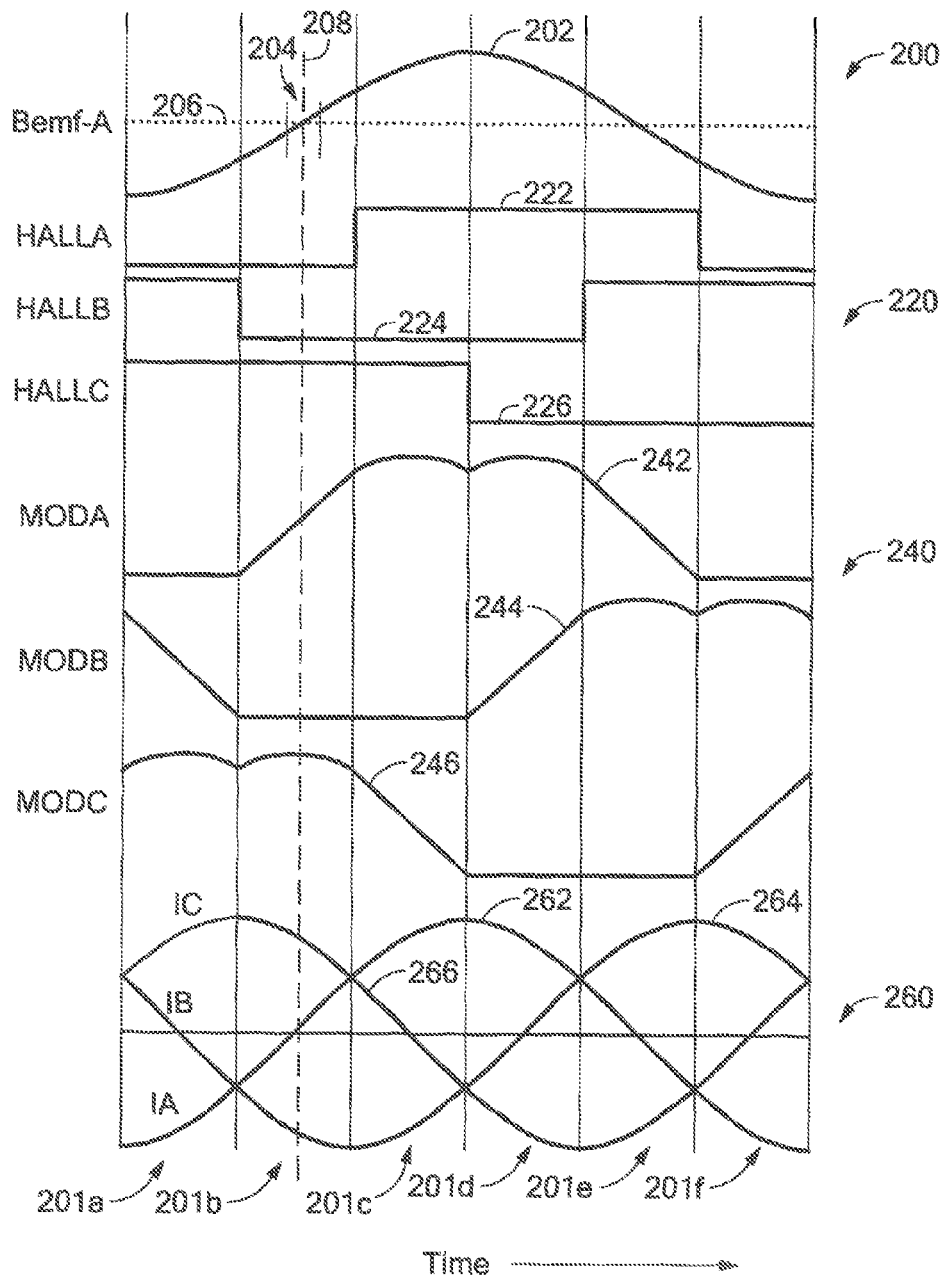
FIG. 2 is a graph showing a variety of waveforms associated with the exemplary motor control circuit of FIG. 1, in particular, when the motor control circuit is used to provide a sinusoidal drive to a motor.

Referring now to FIG. 2, graphs 200, 220, 240, and 260 have a horizontal axes with scales in units of time in arbitrary units. The graphs 200, 220, 240 have vertical axes with scales in units of voltage in arbitrary units. The graph 260 has a vertical axis with a scale in units of current in arbitrary units.

A signal 202 is representative of a back EMF signal (i.e., a voltage signal) on one of the motor windings (e.g., winding A 104a) of the motor 104 of FIG. 1 when the motor 104 is spinning. The back EMF voltage 202 is generally sinusoidal.

In some embodiments of the motor control circuit 102 of FIG. 1, the zero crossing of the back EMF signal 202 can be used by the position measurement module 142 to identify a reference rotational position of the motor 104. It is desirable that the zero crossing of the back EMF signal 202 at the time 208 be coincident or nearly coincident with a zero current passing through the motor winding upon which the back EMF signal 202 is generated. Such a relationship will result in most efficient motor operation.

In some embodiments of motor control circuit 102, a back EMF signal is not used to detect rotational position of the motor 104. Instead, Hall elements are positioned about the motor 104 and Hall element signals 222, 224, 226 are generated as the motor 104 rotates. It should be apparent that the signals 222, 224, 226 are representative of rotational positions of the motor 104. Characteristically, it can be seen that none of the transitions of the Hall element signals 222, 224, 226 align with the zero crossing of the back EMF signal 202. Nevertheless, the time 208 can be identified by the signals 222, 224, 226 as being part way, e.g., halfway, between particular transitions of the signals 222, 224, 226.

Signals 242, 244, 246 are representative of the above-described modulation waveforms 146a, 146b, 146c of FIG. 1. The modulation waveforms 242, 244, 246 are used to generate PWM signals to drive the motor 104. Correspondence between the modulation waveforms 242, 244, 246 and the PWM signals is described more fully below in conjunction with FIG. 6.

It will be recognized that the modulation waveform 242 is associated with the winding A 104a of FIG. 1 and generally aligns with the back EMF signal 202 that is associated with the same winding. The other modulation waveforms 244, 246 are associated with the other windings B, C 104b, 104c, respectively, of the motor 104 of FIG. 1.

Signals 262, 264, 266 are representative of currents that appear on the windings A, B, C 104a, 104b, 104c, respectively, of the motor 104 of FIG. 1. It will be understood that the actual current signals on the motor windings may be more complex than those shown in the signals 262, 264, 266. However the current signals 262, 264, 266 are representative of an average current versus time through the three motor windings. It will be understood that the current 262 on the motor winding A 104a is generally in phase with the back EMF signal 202. However, there can be a phase difference between the current signal 262 and the associated back EMF signal 202 as described more fully below in conjunction with FIG. 3.

An electrical revolution of the motor 104 can be divided into six states, or time periods, 201a, 201b, 201c, 201d, 201e, 201f.

Figure 3:
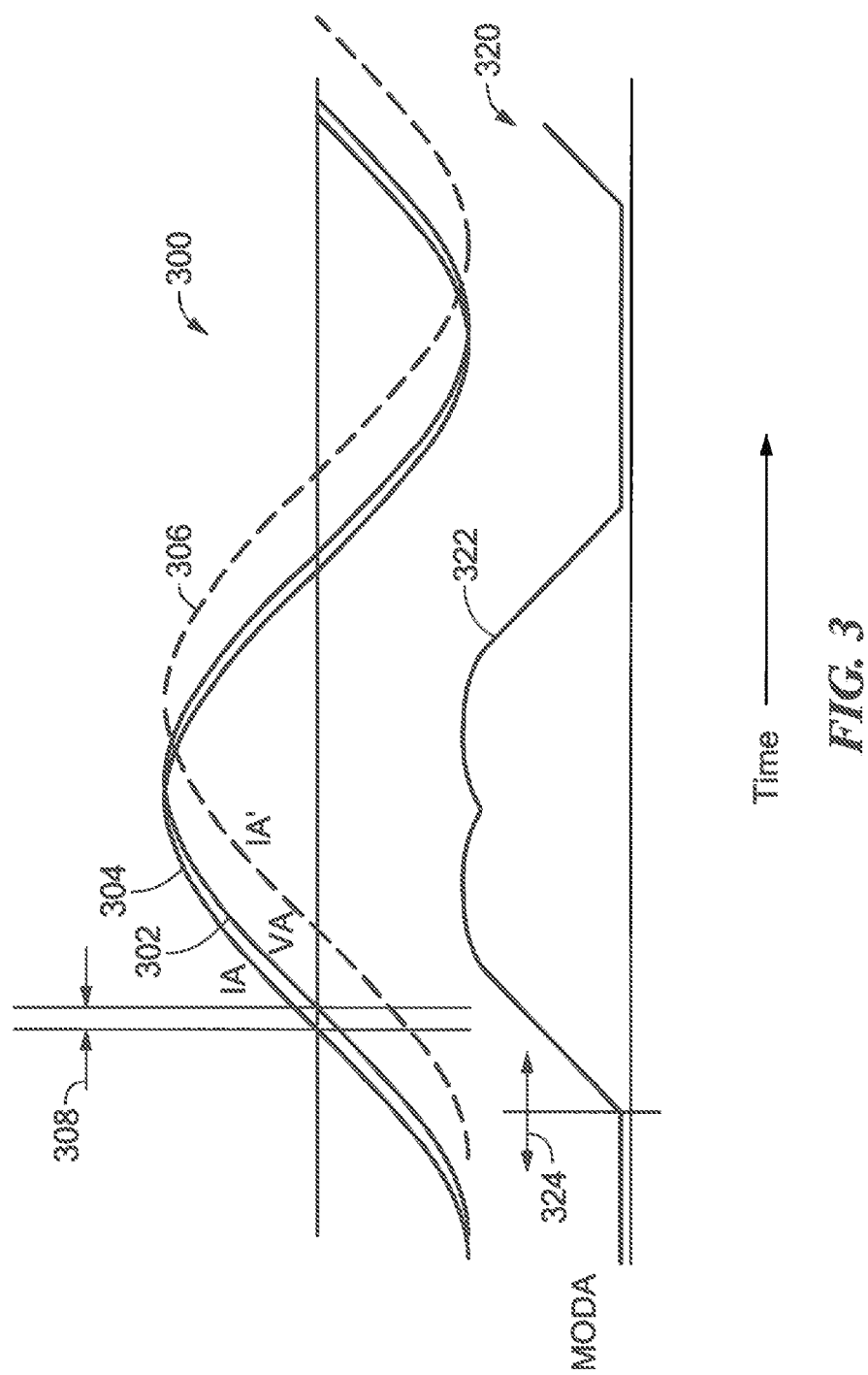
FIG. 3 is another graph showing a variety of waveforms associated with exemplary motor control circuit of FIG. 1, in particular, when the motor control, circuit is used to provide a sinusoidal drive to the motor, and showing phase differences between a current signal and a position reference signal.

Referring now to FIG. 3, a graph 300 has a horizontal axis with a scale in units of time in arbitrary units. The graph 300 also has a vertical axis with a scale in units of voltage and current in arbitrary units, A graph 320 has a horizontal axis with a scale in units of time in arbitrary units. The graph 320 also includes a vertical axis with a scale in units of voltage in arbitrary units.

A signal 304 is representative of a current signal on the winding A 104a of FIG. 1. Thus, the signal 304 corresponds to the signal 262 of FIG. 2. A signal 302 is representative of a back EMF signal 136 on the winding A 104a of FIG. 1. Thus, the signal 302 corresponds to the signal 202 of FIG. 2. Zero crossings of the signals 302, 304 will be apparent. A time difference 308 is indicative of a time difference between a zero crossing of the back EMF signal 302 and a zero crossing of the current signal 304. Therefore, the time difference 308 is representative of a time difference between a rotational position reference (i.e., the zero crossing of the back EMF signal 302) and a zero current passing through the associated motor winding.

A signal 306 is representative of a current signal on the winding A 104a of FIG. 1 during a time period during which the motor 104 is accelerating in rotational speed or during which the motor 104 is rotating at high speed. It can be seen that relative phases have shifted. The zero crossing of the current signal 306 is retarded with respect to the zero crossing of the back EMF signal 302. The zero crossing of the back EMF signal 302 is indicative of a reference rotational position of the motor 104. The zero crossing of the current signal 306 is representative of a zero current through the motor winding A 104a. It is desirable that the zero crossings coincide in time and phase. A lack of time coincidence will result in increased motor noise and vibration, and decreased motor efficiency.

A modulation waveform 322 is the same as or similar to the modulation waveform 242 of FIG. 2. Thus, when the motor is accelerating or rotating rapidly, it can be seen that the current signal 306 is retarded relative to the modulation waveform 322. It would be desirable to advance the modulation waveform 322 (i.e., move the modulation waveform 322 to the left) to advance the current signal 306 so that a zero crossings of the current signal 306 can occur coincident or nearly coincident with the zero crossing of the back EMF signal 302, which is indicative of a rotational reference position of the motor 104.

In general, the modulation signal generation module 146 of FIG. 1 is able to advance or retard the various modulation waveforms 146a, 146b, 146c in accordance with a received rotational position reference signal 142a and in accordance with the zero current signal 144a, of which the back EMF signal 302 and the current signals 304, 306 are representative.

For conventional sinusoidal motor drive signals, such as those described above in conjunction with FIGS. 2 and 3, for reasons described above in conjunction with FIG. 1, it is not readily possible to observe and detect a zero crossing of the back EMF signal 302, because each one of the motor windings 104a, 104b, 104c is constantly being driven. In order to observe a back EMF signal, it is necessary to at least momentarily stop a drive signal to a motor winding. Thus, with a sinusoidal motor drive signal arrangement, in some embodiments, the sinusoidal drive signal to at least one of the windings 104a, 104b, 104c of the motor 104 can be stopped for a small time window in order to observe the zero crossing of the back EMP signal. To this end, in the motor control circuit 102 of FIG. 1, a control signal 142b can be provided by the position measurement module 142 to the gate driver 110.

Figure 4:
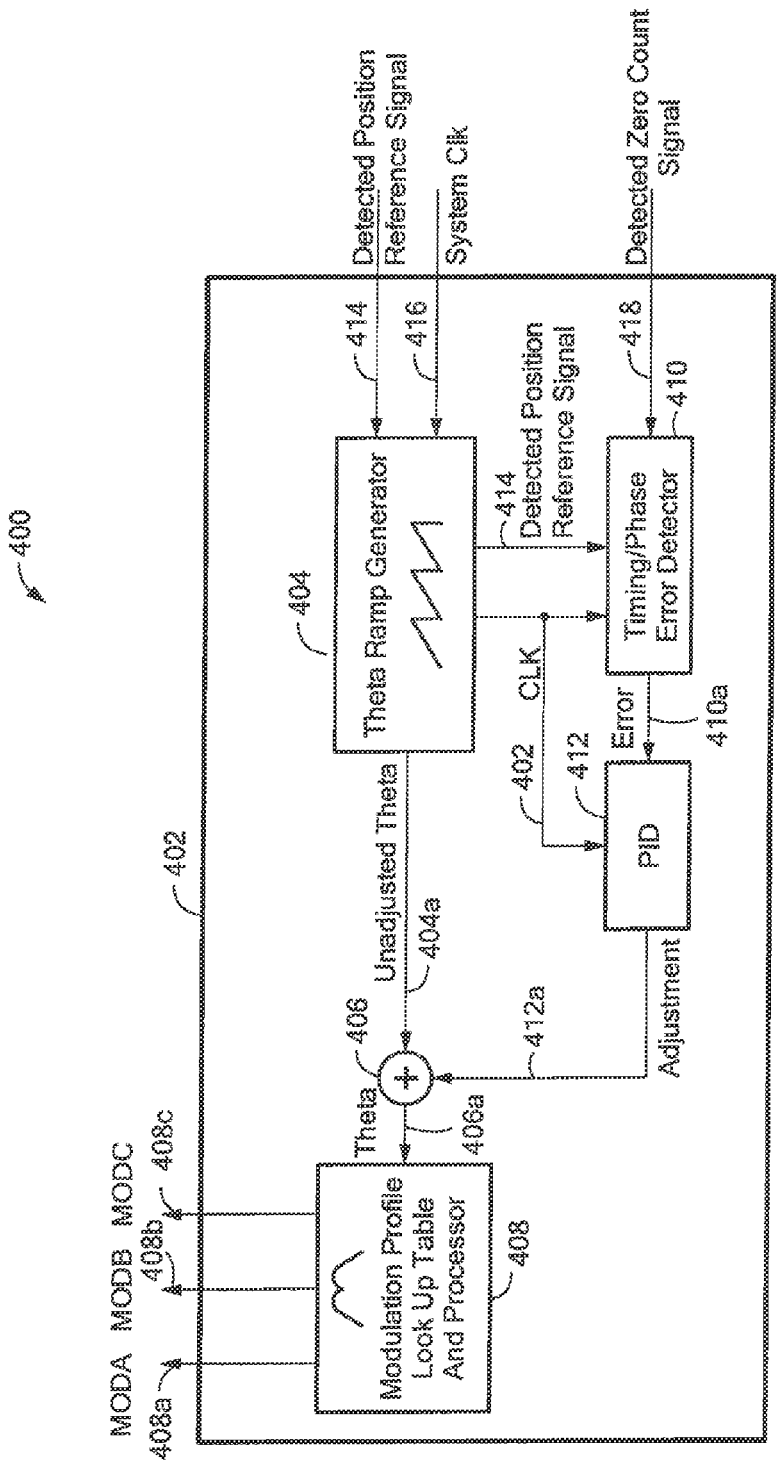
FIG. 4 is a block diagram of an exemplary modulation signal generation module that can be used as a modulation signal generation module of the exemplary motor control circuit of FIG. 1.

Referring now to FIG. 4, a modulation signal generation module 402 can be used as the modulation signal generation module 146 of FIG. 1.

The modulation signal generation module 402 is coupled to receive a detected position reference signal 414 and a detective zero current signal 418. The detected position reference signal 414 can be the same as or similar to the position reference signal 142a of FIG. 1. The detected zero current signal 418 can be the same as or similar to the zero current signal 144a of FIG. 1.

As described, above, the detected position reference signal 414 can be generated in conjunction with zero crossings of a back EMP signal using a sinusoidal drive waveform by using a short time period during which the sinusoidal drive to a winding is stopped. In other embodiments, the detected position reference signal 414 can be generated in conjunction with Hall elements disposed around the motor 104 of FIG. A and associated Hall element signals.

The modulation signal generation module 402 is also coupled to receive a system clock signal 416 having a fixed high frequency.

A so-called "theta ramp generator" 404 is coupled to receive the detected position reference signal 414 and the system clock signal 416. The theta ramp generator 404 is configured to generate an unadjusted theta signal 404a, which can be a digital signal comprised of a sequence of values representative of a ramp signal that periodically reaches a terminal value and resets to zero. The reset time of the ramp signal is fixed in relation to the position reference (i.e., a fixed rotational position of the motor 104) of which the detected position reference signal 414 is indicative.

In operation, the theta ramp generator 404 can identify a time period, measured by counting a number of system clock transitions, between position references identified by the detected position reference signal 414. In other words, the theta ramp generator 404 can identify a time (i.e., a number of transitions of the system clock signal 416) that it takes the motor 104 to turn through one electrical rotation. The theta ramp generator 404 can divide the identified number of transitions of the system clock 416 by a fixed scalar, for example, by 256. Thus, a motor electrical revolution can be divided into 256 parts. Accordingly, the clock signal 402 can have a frequency that achieves, for example, 256 transitions during one electrical revolution of the motor. The clock signal 402 can be generated by and used by the theta ramp generator 404 to generate a rate at which ramp values of the unadjusted theta signal 404a are incremented and output within the unadjusted theta signal 404a. Thus, it will be understood that resets to zero of the ramp signal in the unadjusted theta signal 404a are achieved once for every electrical revolution of the motor, and there can be, for example, 256 steps in the ramp.

A timing/phase error detector 410 is coupled to receive the detected zero current signal 418, coupled to receive the detected position reference signal 414, and coupled to receive the clock signal 402.

The timing/phase error detector 410 is configured to identify a time difference a phase difference) between a position reference identified by the detected position reference signal 414 and a zero current crossing identified by the detected zero current signal 418.

Referring briefly again to FIG. 3, in other words, the timing/phase error detector 410 is operable to identify a time difference between the zero crossing of the current signal 304 or 306 and a zero crossing of a back EMF voltage signal 302.

Referring again to FIG. 4, the timing/phase error detector 410 is configured to generate an error signal 410a, which, in some embodiments, can be a digital value, representative of the identified time (i.e., phase) difference.

A proportional integrator differentiator (PID), or, in other embodiments, a proportion integrator (PI), can be coupled to receive the error signal 410a, and configured to essentially filter the error signal 410a to generate an adjustment signal 412a. In some embodiments, the adjustment signal 412a can be a digital value proportional to the time difference identified by the timing/phase error detector 410.

A summing module 406 is coupled to receive the unadjusted theta signal 404a (i.e., a sequential set of digital values representative of a resetting ramp signal at a fixed phase), coupled to receive the adjustment signal 412a, and configured to generate a theta signal 406a.

In operation, it should be understood that the theta signal 406a is a resetting ramp signal like the unadjusted theta signal 404a, but for which the reset times of the ramp signal are moved in time, i.e., adjusted phase, in accordance with a value of the adjustment signal 412a.

A modulation profile look up table and processor 408 is coupled to receive the theta signal 406a. The modulation profile look up table and processor 408 is configured to store therein value representative of one or more modulation profiles, for example, the modulation profile 242 of FIG. 2.

In operation, the theta signal 406a is used to sequence between values of the stored modulation signal within the modulation profile look up table and processor 408. It will be understood that, a phase of the theta signal 406a, of which reset portions of the theta signal 406a are representative, is adjustable according to a time difference between a position reference identified within the detected position reference signal 414 and a zero crossing of the current in a motor winding as identified within the detected zero crossing signal 418. Accordingly, a phase, i.e., a timing of a modulation signal 408a generated by the modulation profile look up table and processor 408 is adjustable.

A processor portion of the modulation profile look up table and processor 408 can automatically generate other modulation profiles 408b, 408c at other fixed phases, for example, the modulation profiles 244, 246 of FIG. 2, which can be at fixed phases relative to the modulation profile 408a, e.g., the modulation profile 242 of FIG. 2.

Exemplary circuits and methods to detect a zero current through motor windings are described below in conjunction with FIGS. 5-8. However, it should be appreciated that other methods can be used to detect a zero current passing through a motor winding.

Figure 5:
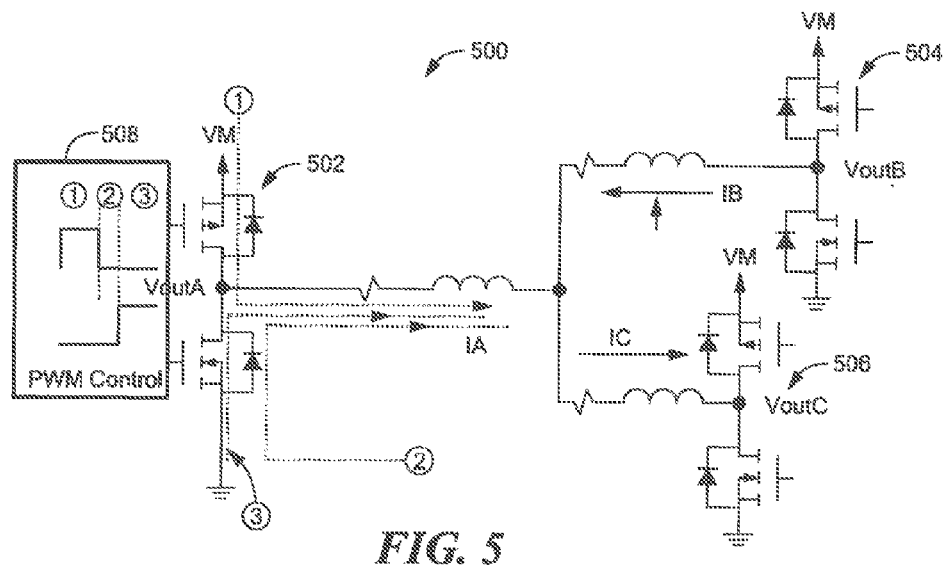
FIGS. 5 and 5A are block diagrams showing exemplary half bridge output stages of the exemplary motor control circuit of FIG. 1, and showing directions of motor winding current at different phases of operation.

Referring now to FIG. 5, three half bridge circuits 502, 504, 506 correspond to the three half bridge circuits 112/114, 116/118, 120/122 of FIG. 1 and are shown driving three motor windings. Currents through the half bridge circuit 502 and through one of the motor windings are indicated by dashed lines identified by circled numbers 1, 2, and 3. The currents 1, 2, and 3 are indicative of currents at different times through the half bridge circuit 502 during a positive polarity of a current signal in the motor winding, e.g., during positive parts of the current signal 262 of FIG. 2. The current 1 is indicative of the upper FET being on, the current 3 is indicative of the lower FET being on, and the current 2 is indicative of both FETS being turned off. It will be appreciated that the current 2 passes through an intrinsic diode of the lower FET, and thus, the voltage VoutA (see e.g., signal 124 of FIG. 1) achieves a voltage approximately 0.7 volts below ground beginning when the two FETs of the half bridge 502 are turned off and returns to ground voltage when the lower FET turns on. Thus, it will be appreciated that, by detecting the voltage VoutA going below ground and returning to ground, an actual zero current through the half bridge 502 and through the associated motor winding can be identified.

Figure 5A:
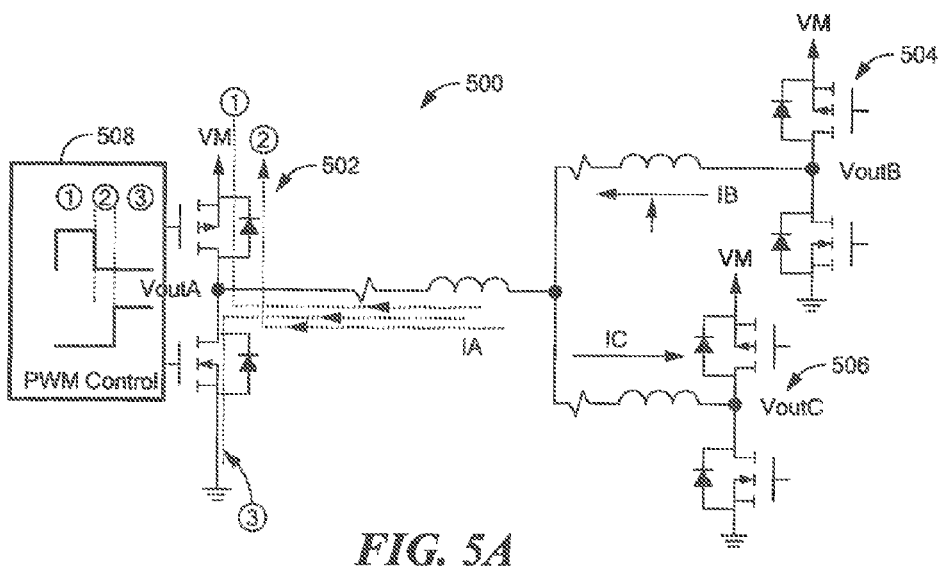

Referring now to FIG. 5A, in which like elements of FIG. 5 are shown having like reference designations, currents through the half bridge circuit 502 and through one of the motor windings are again indicated by dashed lines identified by circled numbers 1, 2, and 3. The currents 1, 2, and 3 are indicative of currents at different times through the half bridge circuit 502 during a negative polarity of a current signal in the motor winding, e.g., during negative parts of the current signal 262 of FIG. 2. The current 1 is indicative of the upper FET being on, the current 3 is indicative of the lower PET being on, and the current 2 is indicative of both PETS being turned off. It will be appreciated that the current 2 passes through an intrinsic diode of the upper FET, and thus, the voltage VoutA achieves a voltage approximately 0.7 volts above the voltage VM beginning when the two FETs of the half bridge 502 are turned off and returns to the voltage VM when the upper PET turns on Thus, it will be appreciated that, by detecting the voltage VoutA going above the voltage VM and returning to the voltage VM, an actual zero current through the half bridge 502 and through the associated motor winding can be identified.

Figure 6:
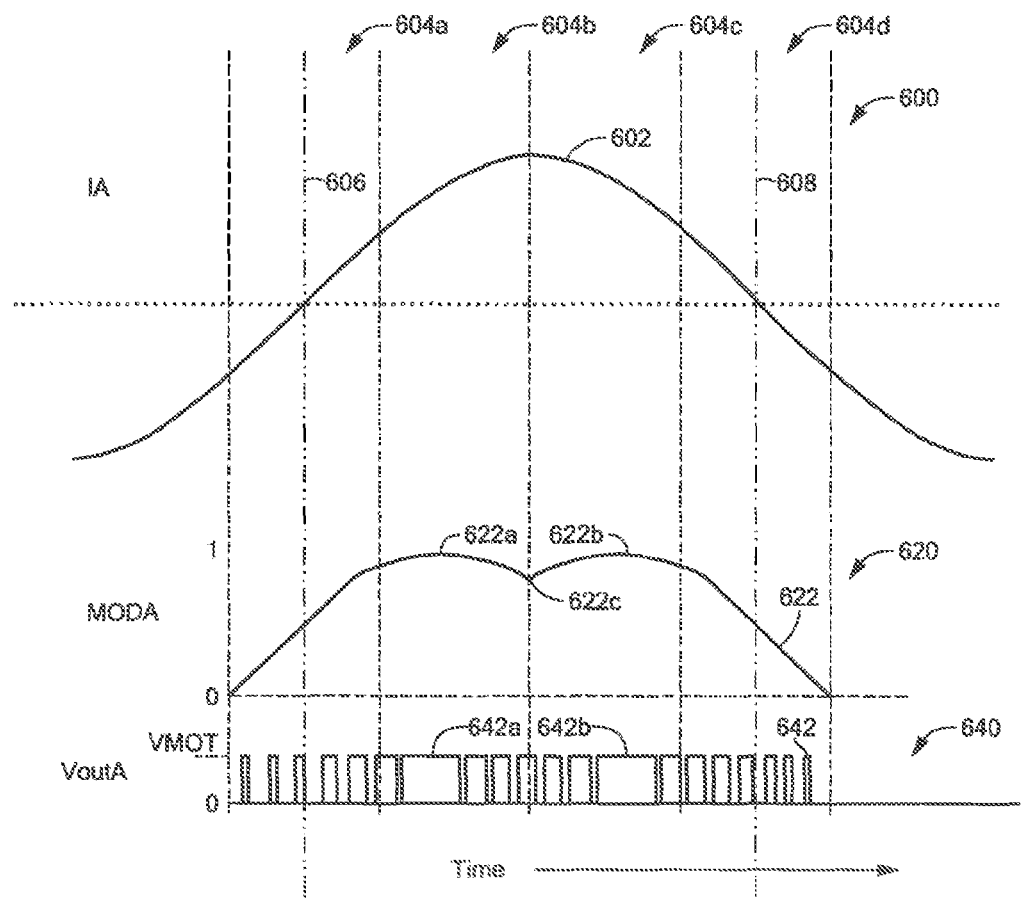
FIG. 6 is a graph showing waveforms associated with the motor winding, in particular, a sinusoidal current, a modulation waveform associated with a sinusoidal drive of the motor winding, and a pulse width modulated (PWM) signal that drives a motor in accordance with the modulation waveform.

Referring now to FIG. 6, a graph 600 has a horizontal axis with a scale in units of time in arbitrary units and a vertical axis with a scale in unit of current in arbitrary units. A graph 620 has a horizontal axis with a scale in units of time in arbitrary units and a vertical axis with a scale in unit of voltage in arbitrary units. A graph 640 has a horizontal axis with a scale in units of time in arbitrary units and a vertical axis with a scale in unit of voltage in arbitrary units.

A signal 602 is representative of a current signal in a motor winding A when a sinusoidal drive signal is used. The current signal 602 can be the same as or similar to the current signal 262 of FIG. 2. As described above, when a PWM drive signal is used, the current signal 602 can appear more complex, but the signal 602 is generally representative of an average current through the winding A. The current signal has zero crossings at time 606, 608.

A modulation signal 622 can be the same as or similar to the modulation signal 242 of FIG. 2. The modulation signal 622 can have six time periods or phases, of which four are shown 604a, 604b, 604c, 604d.

A PWM signal 642 can be generated in accordance with the modulation waveform 622 and can have times of high duty cycle 642a, 642b at times of peaks 622a, 622b of the modulation waveform 622 and times of lower duty cycle at times of other portions of the modulation waveform 622 in accordance with values of the modulation waveform 622. The PWM signal 642 can be the signal actually applied to the motor winding A 104a of the motor 104 of FIG. 1 for a sinusoidal drive.

Figure 7:
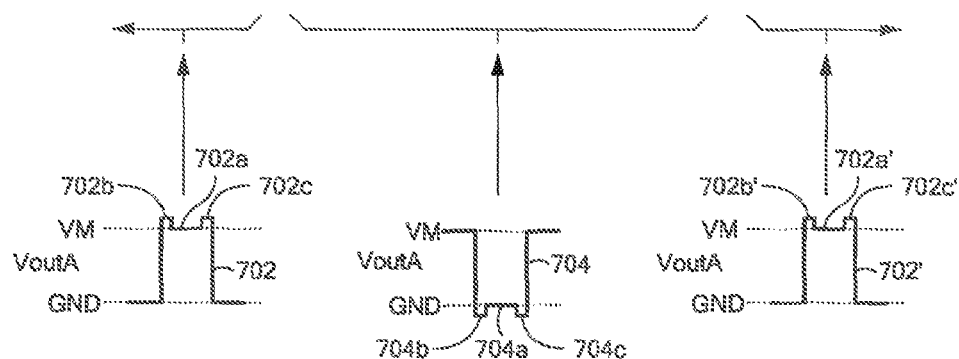
FIG. 7 is a pictorial showing details of positive and negative states of the PWM signal of FIG. 6.

Referring now to FIG. 7, PWM pulses 702, 702 are indicative of the PWM pulses 642 of FIG. 6 during negative polarity portions of the current signal 602. A PWM pulse 704 is indicative of the PWM pulses 642 of FIG. 6 during positive polarity portions of the current signal 602.

The PWM pulses 702, 702' have raised or transient portions 702b, 702c, 702b', 702c' and steady state portions 702a, 702a'. In accordance with the discussion above in conjunction with FIGS. 5 and 5A, it will be appreciated that, when both transistors, e.g., FETs, of a half bridge are turned off, a voltage VoutA appearing on the associated motor winding temporarily goes above the motor voltage VM, or below ground, depending upon a polarity of the current in the motor winding, i.e., a polarity of the current signal 602. It will also be appreciated that each major edge transition of the PWM signals 702, 704, 702' is preceded by a short time period during which both of the FETs are turned off, otherwise, both FETs might simultaneously turn on, resulting in a short circuit between the motor voltage VM and ground. Thus, when the two FETs are turned off, the transient signal portions 702b, 702c, 704b, 704c, 702b', 702c' result. The transient signal portions 702b, 702c, 704b, 704c, 702b', 702c' can occur for a short time period, for example, for about five hundred nanoseconds.

It will be apparent that the direction of the transient voltage signal portions 702b, 702c, 704b, 704c, 702b', 702c' change direction upon each occurrence of a zero crossing of the current signal 602, i.e., at times 606, 608. Thus, detection of changes in direction of the transient signal portions 702b, 702c, 704b, 704c, 702b', 702c' can be used to identify a zero current in the associated motor winding.

Referring now to FIG. 7A, a graph 720 has a horizontal axis with a scale in units of time in arbitrary units and a vertical axis with a scale in unit of voltage in arbitrary units. A graph 740 has a horizontal axis with a scale in units of time in arbitrary units and a vertical axis with a scale in units of current in arbitrary units.

A signal 722 is representative of the PWM signal 642 of FIG. 6, but showing transient signal portions like the transient portions 702b, 702c, 704c, 704d, 702b', 702c' of FIG. 7. A signal 742 is the same as or similar to the current signal 602 of FIG. 6.

Times t1-t9 occur during the transient signal portions. From discussion above in conjunction with FIGS. 5 and 5A, it will be apparent that the transient signal portions occur when both FETs of an associated half bridge circuit driving a motor winding are turned off.

For reasons described above in conjunction with FIGS. 5, 5A, and 7, at the time t6, the transient signal portion changes orientation coincident or nearly coincident with a zero crossing of the current signal 742. Thus, the change of orientation of the transient signal portions can be used to detect a zero current crossing in a motor winding. In particular, at the times t1-t5, the transient signal portions extend above the motor voltage VM. Conversely, at the times t6-t9, the transient signal portions extend below ground. Another change or orientation (not shown) of the transient signal portions occurs at a next zero crossing of the current signal 742, and can also be used to detect the next zero crossing.

In some embodiments, a circuit (see, e.g., comparators 808, 810 shown below in FIG. 8) can be operable to sample the signal VoutA 722 to detect the signal transient portions only at or near to the times t1-t9, and also at other similar times that follow. The times t1-t9 and similar times that follow are known, since both FETs are momentarily turned off at those times. In other embodiments, the signal 722 can be continually sampled to detect the transient signal portions.

In some embodiments, the changes of orientations of the transient signal portions can be detected with two comparators. Both zero crossings of the current signal 742 can be detected. However, in other embodiments, one comparator can be used to detect the presence or absence of transient signal portions that either extend upward or that extend downward. Still, both zero crossings of the current signal 742 can be detected with one comparator.

Figure 8:
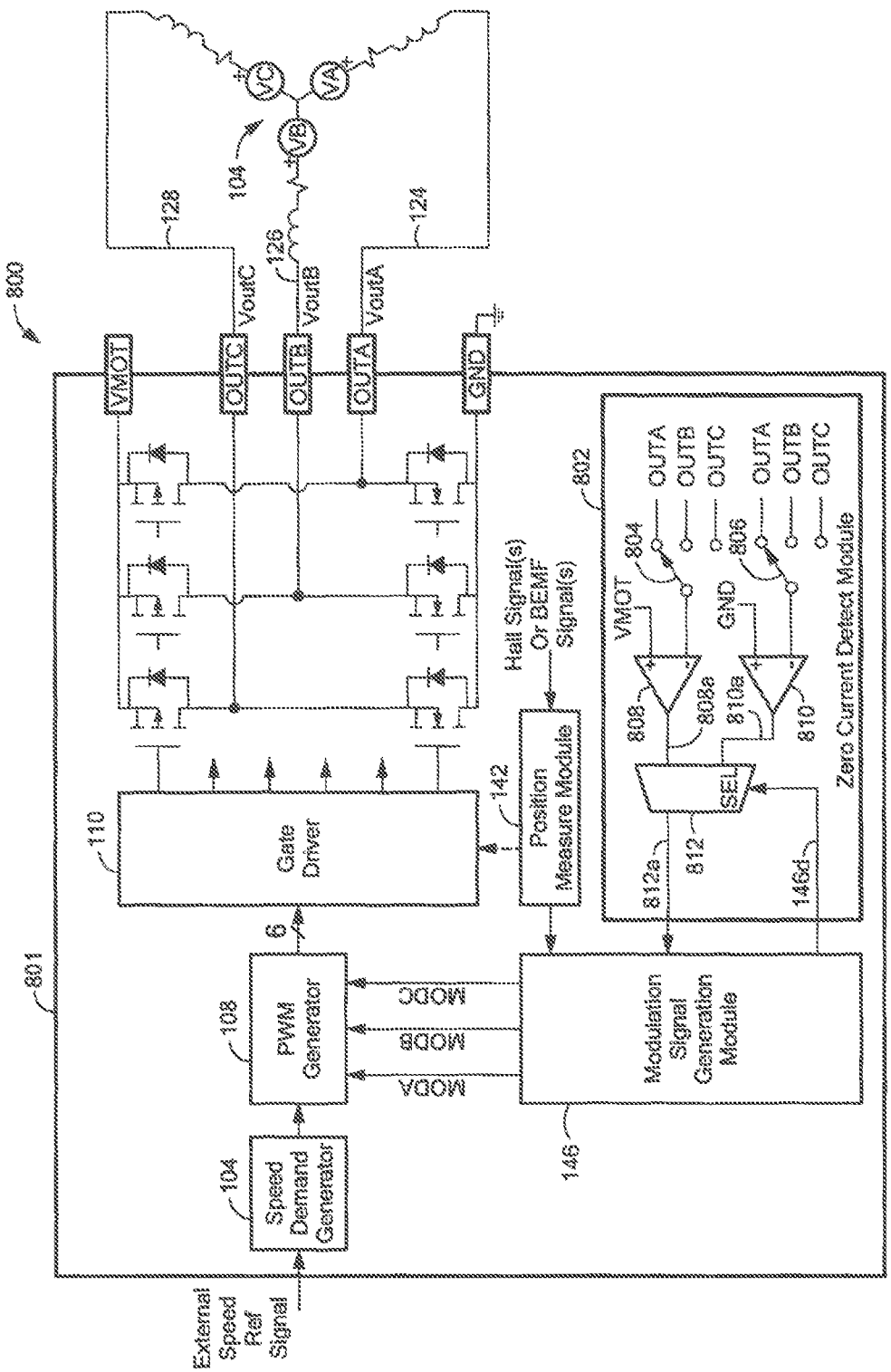
FIG. 8 is a block diagram of another exemplary motor control circuit having a modulation signal generation module and having a current measure module in the form of a zero current detection module.

Referring now to FIG. 8, in which like elements of FIG. 1 are shown having like reference designations, a zero current detection module 802 can be the same as or similar to the current measurement module 144 of FIG. 1.

The zero current detection module 802 can include a first comparator 808 coupled to the three motor windings via a selectable switch 804. The zero current detection module 802 can also include a second comparator 810 coupled to the three motor windings via a selectable switch 806. The first comparator 808 can be coupled to receive a reference voltage equal to or close to the motor voltage VM. The second comparator 810 can be coupled to receive a reference voltage equal to or close to ground.

The first comparator 808 is configured to generate an output signal 808a indicative of voltage on a selected motor winding going above the motor voltage. The second comparator 810 is configured to generate an output signal 810a indicative of voltage on a selected motor winding going below ground. Thus, in operation, the first comparator 808 operable to detect the positive transient signal portions 702b, 702c, 702b', 702c' of the PWM signal of FIG. 7 associated with a sinusoidal motor drive. Similarly, in operation, the second comparator 810 is operable to detect the negative transient signal portions 704b, 704c of the PWM signal of FIG. 7 associated with a sinusoidal motor drive. As described above, edges of these signal portions can be used to identify a zero current crossing in an associated motor winding.

The zero current detection module 802 can also include a multiplexer 812 coupled to receive the output signal 808a, 810a and configured to generate and output single 812a representative of a selected one of the output signals 808a, 810a.

The multiplexer 812 can be coupled to receive a control signal 146d from the modulation signal generation module 146. The switches 804, 806 can be coupled to receive other control signals (not shown) from the modulation signal generation module 146.

The modulation signal generation module 146 can use a variety of types of logic to identify a zero current crossing in one or more of the motor windings. For example, in accordance with the discussion above in conjunction with FIGS. 7 and 7A, for a PWM sinusoidal motor drive signal, the output signals 808a, 810a can be used to identify a change in direction of the transient signal portions 702b, 702c, 704b, 704c, 702b', 702c' of the PWM signal 642. Essentially, the multiplexer 812 can switch to view the other comparator whenever detection is made of a particular direction of the transient signal portions.

In some embodiments, the switches are not used and only one motor winding is used to provide signals to the comparators 808, 810. In some embodiments, only one comparator is used and the multiplexer 812 is not necessary. A variety of different types of logic can be used by the modulation signal generation module 146 to identify a zero crossing of a current through a motor winding by using the above described technique of detecting when a voltage on a motor winding goes above the motor voltage VM and/or below ground.

Figure 9:
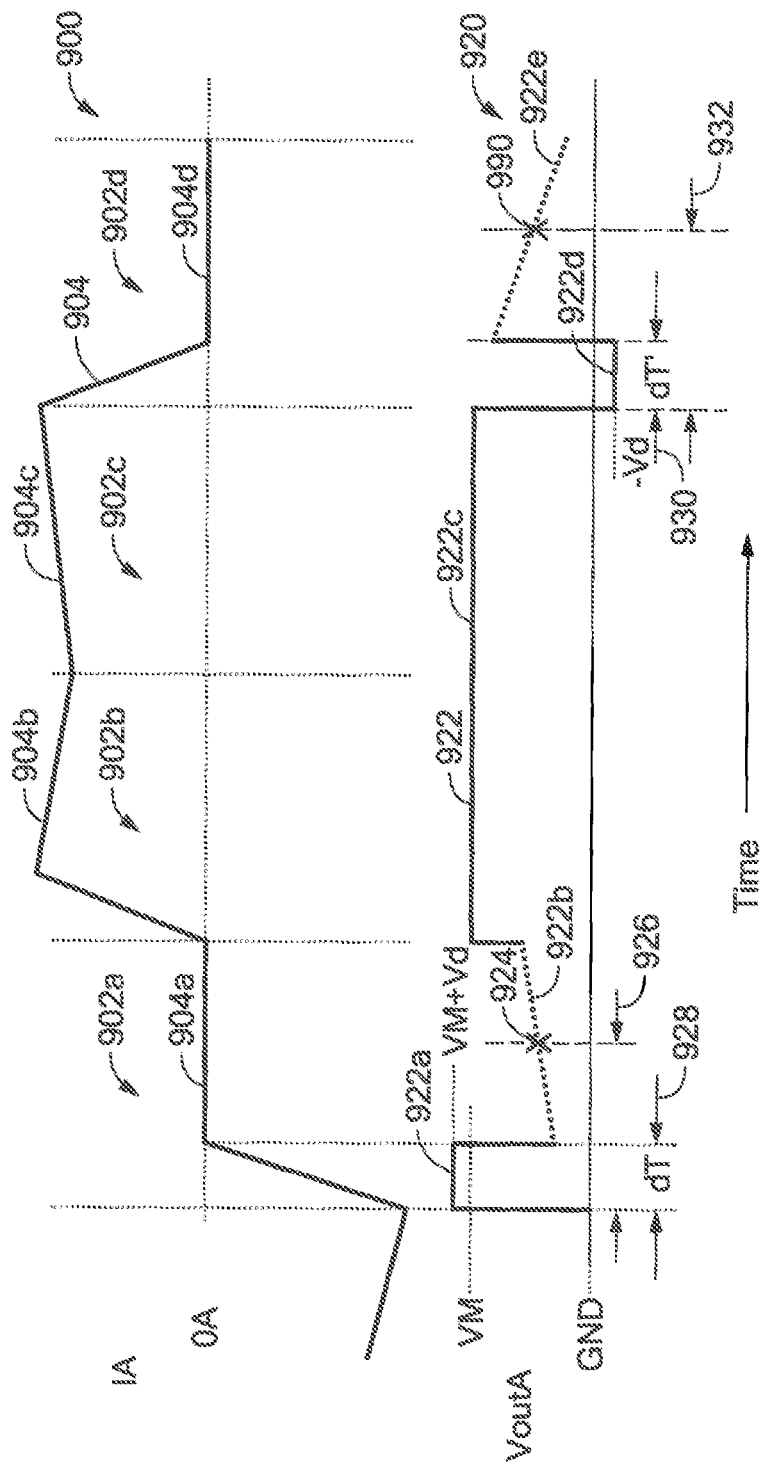
FIG. 9 is a graph showing a variety of waveforms from which a zero current in a motor winding can be detected, in particular, when a trapezoidal drive to a motor is used.

Referring now to FIG. 9, a graph 900 has a horizontal axis with a scale in units of time in arbitrary units. The graph 900 also has a vertical axis with a scale in units of current in arbitrary units. A graph 920 has a horizontal axis with a scale in units of time in arbitrary units. The graph 920 also has a vertical axis with a scale in units of voltage in arbitrary units.

A signal 904 is representative of a trapezoidal motor drive, as opposed to the sinusoidal motor drive signals described above. The signal 904 is representative of a trapezoidal current signal on a motor winding.

It will be understood that the voltage waveform 922 is representative of an actual voltage applied to a motor winding for a one hundred percent motor drive. For one hundred percent motor drive, the signal 922 achieves a voltage of VM (motor voltage) with a duty cycle of one hundred percent, and at other times is zero. For a different trapezoidal motor drive of less than one hundred percent (not shown), during the time period that the one hundred percent drive signal 922 achieves the voltage of VM, the different trapezoidal motor drive provides a pulse width modulated signal that has a pulse width modulation with a duty cycle in accordance with the motor drive of less than one hundred percent.

The time of a motor electrical revolution can be broken into six states, with only four of the states 902a, 902b, 902c, 902d shown. Signals during the other two states will be apparent. Each one of the motor windings receives a motor drive signal like the motor drive signal 922, but shifted in phase and beginning at a different one of the phases.

With a trapezoidal drive, a drive signal applied to a motor winding is zero during the first phase 902a and also zero during the fourth phase 902d. Thus, during the first and fourth phases 902a, 902d, the current signal 904 achieves a zero current during a signal portion 904a and during a signal portion 904d. The zero current is not achieved immediately at the beginning of the first and fourth phases 902a, 902d due to inductive behavior of the motor winding. For reasons described above in conjunction with FIG. 1, when the drive voltage applied to a winding is zero, and the current decays to zero, the back EMF voltage is directly observable across the winding.

For reasons described more fully above in conjunction with FIGS. 5 and 5A, during a signal portion 922a, the signal 922 on the motor winding achieves a voltage of VM+Vd, and, during a signal portion 922d, the signal 922 achieves a voltage of −Vd. An exemplary method of detecting the zero current during signal portions 904a, 904d is described above in conjunction with FIGS. 5 and 5A. To this end, parts 922a, 922d of the signal 922 can be used to detect the zero winding current using circuits and techniques such as those described above in conjunction with FIGS. 5, 5A and 8.

During a portion of the first and fourth phases 902a, 904d, in particular, during dashed parts 922b, 922e of the voltage signal 922, the back EMF voltage is directly observable. During the parts 922b, 922e of the voltage signal 922, and also during parts 922a, 922d, no drive signal is applied to an associated motor. As described above, inductive behavior of the motor winding causes the current through the motor winding to achieve zero current only during the parts 922b, 922e of the drive signal 922.

From the above discussion, it should be apparent that, with a trapezoidal drive and using six motor drive states, there are substantial time periods when each motor winding is not being driven, for example, the motor winding is not being driving during time periods associated with signal portions 922a, 922b that together occupy one sixth (i.e., sixty degrees) of a motor electrical rotation and during time periods associated with signal portions 922d, 922e that together occupy another one sixth (i.e., sixty degrees) of a motor electrical rotation. The current through the motor winding becomes zero at the ends of transient signal portions 922a, 922d, i.e., during signal portions 922b, 922e. During the signal portions 922b, 922e, the back EMF voltage is directly observable. Thus, unlike the sinusoidal drive described above, for which motor windings are continuously driven, with the six state trapezoidal drive arrangement, there is no need to separately generate a time window during which no motor drive is applied to the windings in order to detect the transient signal portions 922a, 922d, ends of which are indicative of zero winding current, or to detect a zero crossings during the signal portions 922b, 922e, which are indicative of motor rotational position.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating those concepts, structures and techniques may be used. Accordingly, it is submitted that that scope of the patent should not be limited to the described embodiments but rather should be limited only by the spirit and scope of the following claims.

What is claimed is:

1. A method of driving a multi-phase motor having a plurality of motor windings, the method comprising:
generating a motor drive signal with a half bridge circuit coupled to the electric motor, the half bridge circuit comprising:
first and second series coupled transistors;
a power supply high voltage node for receiving a high power supply voltage;
a power supply low voltage node for receiving a low power supply voltage; and
an output node at which the motor drive signal is generated;
detecting a reverse current passing through at least one of the first or the second transistors, wherein the detecting comprises at least one of:
detecting a voltage at the output node that is above the high power supply voltage; or
detecting a voltage at the output node that is below the low power supply voltage, wherein the method further comprises;

generating a zero current signal indicative of a zero crossing of a current though at least one of the plurality of motor windings in accordance with the detecting the reverse current;
generating a position reference signal indicative of a reference position of an angular rotation of the motor;
comparing a phase of the zero current signal with a phase of the position reference signal to generate a phase comparison signal and
generating a plurality of modulation signals, each having a phase related to a value of the phase comparison signal; and
generating a plurality of motor drive signals to the plurality of motor windings in accordance with the plurality of modulation signals, wherein the generating the plurality of modulation signals comprises:
providing a look up table in which modulation values are stored corresponding to a shape of at least one of the plurality of modulation signals;
generating a first continuous predetermined signal having a smallest value and a largest value and a plurality of values between the smallest and largest values; and
adding to the first continuous predetermined signal a value related to the phase comparison signal to generate a second continuous predetermined signal having the smallest value and the largest value and the plurality of values between the smallest and largest values, wherein the smallest and largest values of the second continuous predetermined signal are shifted in time by an adjustment time from the smallest and largest values of the first continuous predetermined signal, wherein the adjustment time is related to the phase comparison signal.

2. The method of claim 1, wherein the detecting the reverse current comprises:
detecting the reverse current by sampling a voltage at the output node only at times when the first and second transistors are both turned off.

3. The method of claim 1, wherein the motor drive signal comprises:
a plurality of pulse width modulated signals, each one of the plurality of pulse width signals having high states comprising steady state high values proximate to the high power supply voltage and transient high values higher than the higher power supply voltage, and each one of the plurality of pulse width signals also having low states comprising steady state low values proximate to the low power supply voltage and transient low values lower than the lower power supply voltage.

4. The method of claim 1, wherein the generating the position reference signals comprises:
generating a Hall sensor signal with a Hall sensor disposed proximate to the motor.

5. The method of claim 1, wherein the generating the position reference signals comprises:
generating a back EMF signal with a back EMF module coupled to at least one of the plurality of motor windings.

6. The method of claim 1, wherein the generating the position reference signal comprises:
stopping a motor drive signal to the at least one of the plurality of motor windings during a time window proximate to the motor achieving the reference position; and
detecting the reference position during the time window by a zero crossing of a back EMF signal.

7. The method of claim 1, wherein the generating the plurality of modulation signals further comprises:

using the adjusted continuous predetermined signal to sequentially look up values in the look up table to generate the at least one of the plurality of modulation signals; and
generating at least one other modulation signal at a predetermined phase relationship to the at least one of the plurality of modulation signals, each modulation signal related to a respective one of the plurality of pulse width modulated (PWM) signals.

8. The method of claim 1, wherein the first continuous predetermined signal is a first continuous sawtooth ramp signal, wherein the second continuous predetermined signal is a second continuous sawtooth ramp signal, and wherein the adjusted continuous predetermined signal is an adjusted continuous sawtooth ramp signal.

9. An electronic circuit for driving a multi-phase motor having a plurality of motor windings, the electronic circuit comprising:
a half bridge circuit coupled to the electric motor for generating a motor drive signal, the half bridge circuit comprising:
first and second series coupled transistors;
a power supply high voltage node for receiving a high power supply voltage;
a power supply low voltage node for receiving a low power supply voltage; and
an output node at which the motor drive signal is generated;
at least one comparator configured to generate a respective at least one comparator output signal indicative of a reverse current passing through at least one of the first or the second transistors by detecting at least one of:
a voltage at the output node that is above the high power supply voltage; or
a voltage at the output node that is below the low power supply voltage, wherein the electronic circuit further comprises:
a processor configured to generate a zero current signal indicative of a zero crossing of a current though at least one of the plurality of motor windings in accordance with the at least one comparator output signal;
a position measure module configured to generate a position reference signal indicative of a reference position of an angular rotation of the motor; and
a modulation signal generation module is configured to compare a phase of the zero current signal with a phase of the position reference signal to generate a phase comparison signal, and configured to generate a plurality of modulation signals, each having a phase related to a value of the phase comparison signal, wherein the modulation signal generation module comprises:
a look up table in which modulation values are stored corresponding to a shape of at least one of the plurality of modulation signals; and
a predetermined signal generator configured to generate a first continuous predetermined signal having a smallest value and a largest value and a plurality of values between the smallest and largest values a timing/phase error detector coupled to receive a signal representative of the zero current signal, coupled to receive a signal representative of the position reference signal, and configured to generate a signal representative of the phase comparison signal;
a timing/phase error detector coupled to receive a signal representative of the zero current signal, coupled to receive a signal representative of the position reference signal, and configured to generate a signal representative of the phase comparison signal; and a summation module configured to add to the first continuous predetermined signal a value related to the phase comparison signal to generate a second continuous predetermined signal having the smallest value and the largest value and the plurality of values between the smallest and largest values, wherein the smallest and largest values of the second continuous predetermined signal are shifted in time by an adjustment time from the smallest and largest values of the first continuous predetermined signal, wherein the adjustment time is related to the phase comparison signal.

10. The electronic circuit of claim 9, wherein the detecting comprises:

detecting the reverse current by sampling a voltage at the output node only at times when the first and second transistors are both turned off.

11. The electronic circuit of claim 9, wherein the motor drive signal comprises:

a plurality of pulse width modulated signals, each one of the plurality of pulse width signals having high states comprising steady state high values proximate to the high power supply voltage and transient high values higher than the higher power supply voltage, and each one of the plurality of pulse width signals also having low states comprising steady state low values proximate to the low power supply voltage and transient low values lower than the lower power supply voltage.

12. The electronic circuit of claim 9, wherein the position measure module is further configured to generate the position signal in accordance with a Hall signal generated by a Hall sensor disposed proximate to the motor.

13. The electronic circuit of claim 9, wherein the position measure module is further configured to generate the position signal in accordance with a back EMF signal generated in a motor winding.

14. The electronic circuit of claim 9, wherein the electronic circuit is configured to stop a motor drive signal to the at least one of the plurality of motor windings during a time window proximate to the motor achieving the reference position, and wherein the position measure module is configured to generate the position reference signal indicative of the reference position during the time window.

15. The electronic circuit of claim 9, wherein the modulation signal generation module comprises:

wherein the adjusted continuous predetermined signal is used to sequentially look up values in the look up table to generate the at least one of the plurality of modulation signals and also used to generate at least one other modulation signal at a predetermined phase relationship to the at least one of the plurality of modulation signals, each modulation signal related to a respective one of the plurality of pulse width modulated (PWM) signals.

16. The electronic circuit of claim 9, wherein the first continuous predetermined signal is a first continuous sawtooth ramp signal, wherein the second continuous predetermined signal is a second continuous sawtooth ramp signal, and wherein the adjusted continuous predetermined signal is an adjusted continuous sawtooth ramp signal.

* * * * *

UNITED STATES PATENT AND TRADEMARK OFFICE
CERTIFICATE OF CORRECTION

PATENT NO. : 8,917,044 B2
APPLICATION NO. : 13/599234
DATED : December 23, 2014
INVENTOR(S) : Timothy Reynolds et al.

It is certified that error appears in the above-identified patent and that said Letters Patent is hereby corrected as shown below:

In the Specification

Column 2, Line 14 delete "though" and replace with --through--.

Column 2, Line 34 delete "though" and replace with --through--.

Column 2, Line 51 delete "with exemplary" and replace with --with the exemplary--.

Column 2, Line 52 delete "control, circuit" and replace with --control circuit--.

Column 3, Line 28 delete "hack" and replace with --back--.

Column 3, Line 31 delete ", but it" and replace with --, but is--.

Column 3, Line 40 delete "at junction" and replace with --at a junction--.

Column 6, Line 13 delete "crossings" and replace with --crossing--.

Column 6, Line 36 delete "EMP" and replace with --EMF--.

Column 6, Line 44 delete "detective" and replace with --detected--.

Column 6, Line 51 delete "EMP" and replace with --EMF--.

Column 8, Line 4 delete "timing of a" and replace with --timing of, a--.

Column 8, Line 51 delete "PET" and replace with --FET--.

Column 8, Line 51 delete "PETS" and replace with --FETs--.

Column 8, Line 57 delete "PET turns on Thus," and replace with --FET turns on. Thus,--.

Column 8, Line 64 delete "scale in unit" and replace with --scale in units--.

Signed and Sealed this
First Day of March, 2016

Michelle K. Lee
*Director of the United States Patent and Trademark Office*

CERTIFICATE OF CORRECTION (continued)
U.S. Pat. No. 8,917,044 B2

Column 8, Line 66 delete "scale in unit" and replace with --scale in units--.

Column 9, Line 2 delete "scale in unit" and replace with --scale in units--.

Column 9, Line 10 delete "time" and replace with --times--.

Column 9, Line 24 delete "702, 702" and replace with --702, 702'--.

Column 9, Line 57 delete "scale in unit" and replace with --scale in units--.

Column 9, Line 63 delete ", 704c, 704d," and replace with --, 704b, 704c,--.

Column 10, Line 50 delete "808 operable" and replace with --808 is operable--.

Column 10, Line 60 delete "signal" and replace with --signals--.

Column 10, Line 61 delete "and output" and replace with --an output--.

Column 12, Line 4 delete "902a, 904d," and replace with --902a, 902d--.

Column 12, Line 32 delete "a zero crossings" and replace with --zero crossings--.

Column 12, Line 42 delete "that that" and replace with --that the--.

Column 13, Line 2 delete "though" and replace with --through--.

Column 13, Line 9 delete "signal and" and replace with --signal; and--.

Column 14, Line 40 delete "though" and replace with --through--.